(12) United States Patent 　　　　　(10) Patent No.:　US 12,567,201 B2
Suprun 　　　　　　　　　　　　　　　(45) Date of Patent:　Mar. 3, 2026

(54) VIEW SYNTHESIS SYSTEM AND METHOD USING DEPTH MAP

(71) Applicant: LEIA INC., Menlo Park, CA (US)

(72) Inventor: Vadym Suprun, Edmonton (CA)

(73) Assignee: LEIA Inc., Menlo Park, CA (US)

( * ) Notice: Subject to any disclaimer, the term of this patent is extended or adjusted under 35 U.S.C. 154(b) by 134 days.

(21) Appl. No.: 18/412,520

(22) Filed: Jan. 13, 2024

(65) Prior Publication Data

US 2024/0153200 A1　　May 9, 2024

Related U.S. Application Data

(63) Continuation of application No. PCT/US2022/038731, filed on Jul. 28, 2022.

(Continued)

(51) Int. Cl.
　　*G06T 15/20*　　　(2011.01)
　　*G06T 7/70*　　　　(2017.01)
　　　　　　　　(Continued)

(52) U.S. Cl.
　　CPC .............. *G06T 15/205* (2013.01); *G06T 7/70* (2017.01); *G06T 7/90* (2017.01); *G06T 15/06* (2013.01);
　　　　　　　　(Continued)

(58) Field of Classification Search
　　CPC .......... G06T 15/205; G06T 7/90; G06T 7/70; G06T 15/06; G06T 2207/10016;
　　　　　　　　(Continued)

(56) References Cited

U.S. PATENT DOCUMENTS 8,941,643　B1 *　1/2015　Randolph ............... G06T 15/06
　　　　　　　　　　　　　　　　　　345/520
10,129,523　B2 *　11/2018　Michail ................ H04N 13/366
　　　　　　(Continued)

FOREIGN PATENT DOCUMENTS

CA　　　　3226816　　　2/2023
CN　　104102012　A　　10/2014
　　　　　　(Continued)

OTHER PUBLICATIONS

"European Application Serial No. 22853729.6, Response to Communication pursuant to Rules 161(1) and 162 EPC filed Aug. 14, 2024", 18 pgs.

(Continued)

*Primary Examiner* — David T Welch

(74) *Attorney, Agent, or Firm* — Schwegman, Lundberg & Woessner, P.A.

(57)　　　　　　　ABSTRACT

In multiview image generation and display, a computing device can synthesize view images of a multiview image of a scene from a color image and a depth map. Each view image can include color values at respective pixel locations. The computing device can render the view images of the multiview image on a multiview display. Synthesizing a view image can include, for a pixel location in the view image, the following operations. The computing device can cast a ray from the pixel location toward the scene in a direction corresponding to a view direction of the view image. The computing device can determine a ray intersection location at which the ray intersects a virtual surface specified by the depth map. The computing device can set a color value of the view image at the pixel location to correspond to a color of the color image at the ray intersection location.

17 Claims, 5 Drawing Sheets

Related U.S. Application Data

(60) Provisional application No. 63/229,054, filed on Aug. 3, 2021.

(51) Int. Cl.
G06T 7/90 (2017.01)
G06T 15/06 (2011.01)

(52) U.S. Cl.
CPC .............. *G06T 2207/10016* (2013.01); *G06T 2207/10024* (2013.01); *G06T 2207/10028* (2013.01); *G06T 2207/20212* (2013.01); *G06T 2210/21* (2013.01)

(58) Field of Classification Search
CPC . G06T 2207/10024; G06T 2207/10028; G06T 2207/20212; G06T 2210/21
USPC ........................................................ 345/426
See application file for complete search history.

(56) References Cited

U.S. PATENT DOCUMENTS

| | | | | |
|---|---|---|---|---|
| 11,501,488 | B2 * | 11/2022 | Garcia | G06F 3/011 |
| 11,699,263 | B2 * | 7/2023 | Ziegler | G06T 7/50 |
| | | | | 345/426 |
| 2013/0027394 | A1 * | 1/2013 | Kho | G06T 15/205 |
| | | | | 345/419 |
| 2014/0002591 | A1 | 1/2014 | Wenxiu et al. | |
| 2015/0284009 | A1 | 10/2015 | Cullinane et al. | |
| 2016/0159281 | A1 | 6/2016 | Jang et al. | |
| 2016/0379066 | A1 | 12/2016 | Reiche et al. | |
| 2017/0374341 | A1 * | 12/2017 | Michail | G06T 19/00 |
| 2018/0115717 | A1 | 4/2018 | Kao et al. | |
| 2018/0188059 | A1 | 7/2018 | Wheeler et al. | |
| 2018/0225866 | A1 | 8/2018 | Zhang et al. | |
| 2018/0302614 | A1 * | 10/2018 | Toksvig | G06V 30/1914 |
| 2019/0068973 | A1 * | 2/2019 | Hamilton | H04N 19/14 |
| 2019/0318530 | A1 * | 10/2019 | Hunt | G06T 15/06 |
| 2020/0051313 | A1 * | 2/2020 | Uludag | G06T 11/40 |
| 2020/0275073 | A1 | 8/2020 | Hamilton et al. | |
| 2020/0275076 | A1 * | 8/2020 | Hamilton | H04N 19/132 |
| 2020/0304776 | A1 | 9/2020 | Ratcliff et al. | |
| 2020/0380762 | A1 * | 12/2020 | Karafin | G02B 30/00 |
| 2021/0004933 | A1 | 1/2021 | Wong et al. | |
| 2021/0225020 | A1 | 7/2021 | Nonn et al. | |
| 2021/0243472 | A1 | 8/2021 | Jung et al. | |
| 2021/0335031 | A1 * | 10/2021 | Hamilton | G06T 15/503 |
| 2022/0301252 | A1 * | 9/2022 | Wang | G06N 3/048 |

FOREIGN PATENT DOCUMENTS

| | | |
|---|---|---|
| CN | 117795952 | 3/2024 |
| JP | 2017073710 | 4/2017 |
| JP | 2019133214 | 8/2019 |
| JP | 2021093641 A | 6/2021 |
| JP | 2024532687 | 9/2024 |
| JP | 7702567 | 6/2025 |
| KR | 20210003809 A | 1/2021 |
| KR | 20240027813 | 3/2024 |
| TW | 201439591 | 10/2014 |
| TW | 201817220 | 5/2018 |
| TW | 202325015 | 6/2023 |
| TW | I852053 | 8/2024 |
| WO | 2023014576 | 2/2023 |

OTHER PUBLICATIONS

"Canadian Application Serial No. 3,226,816, Voluntary Amendment filed Jan. 16, 2024", 40 pgs.

"Japanese Application Serial No. 2024-506192, Response filed Apr. 22, 2025 to Notification of Reasons for Rejection mailed Feb. 4, 2025", W English Claims, 24.

"European Application Serial No. 22853729.6, Extended European Search Report mailed Apr. 30, 2025", 10 pgs.

"Canadian Application Serial No. 3,226,816, Examiners Rule 86(2) Report mailed Apr. 25, 2025", 7 pgs.

"Japanese Application Serial No. 2024-506192, Notification of Reasons for Rejection mailed Feb. 4, 2025", W English Translation, 9 pgs.

"Taiwanese Application Serial No. 111128627, Office Action mailed Nov. 10, 2023", w English Translation, 6 pgs.

"International Application Serial No. PCT US2022 038731, International Preliminary Report on Patentability mailed Feb. 15, 2024", 5 pgs.

"Japanese Application Serial No. 2024-506192, Voluntary Amendment Filed Apr. 1, 2024", w English Claims, 16 pgs.

"Taiwanese Application Serial No. 111128627, Response Filed May 2, 2024 to Office Action mailed Nov. 10, 2023", 24 pgs.

"European Application Serial No. 22853729.6, Response filed Jul. 28, 2025 to Extended European Search Report mailed Apr. 30, 2025", w English Claims, 21 pgs.

"Canadian Application Serial No. 3,226,816, Response filed Aug. 25, 2025 to Examiners Rule 862 Report mailed Apr. 25, 2025", W English Claims, 45 pgs.

International Search Report and Written Opinion (ISRWO) from the International Searching Authority (ISA/KR) dated Nov. 21, 2022 (8 pages) for counterpart parent PCT Application No. PCT/US2022/038731.

* cited by examiner

VIEW SYNTHESIS SYSTEM AND METHOD USING DEPTH MAP

CROSS-REFERENCE TO RELATED APPLICATIONS

This application is a continuation patent application of and claims priority to International Patent Application No. PCT/US2022/038731, filed Jul. 28, 2022, which claims the benefit of priority to U.S. Provisional Patent Application Ser. No. 63/229,054, filed Aug. 3, 2021, the entirety of each of which is incorporated by reference herein.

STATEMENT REGARDING FEDERALLY SPONSORED RESEARCH OR DEVELOPMENT

N/A

BACKGROUND

A scene in three-dimensional (3D) space may be viewed from multiple perspectives depending on the viewing angle. In addition, when viewed by a user, multiple views representing different perspectives of the scene may be perceived contemporaneously, effectively creating a sense of depth that may be perceived by the user. Multiview displays are capable of rendering and displaying multiview images so that multiple views are perceivable contemporaneously. While some content may be natively captured as a multiview image or multiview video, multiview images or multiview video may be generated from a variety of other sources.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1:
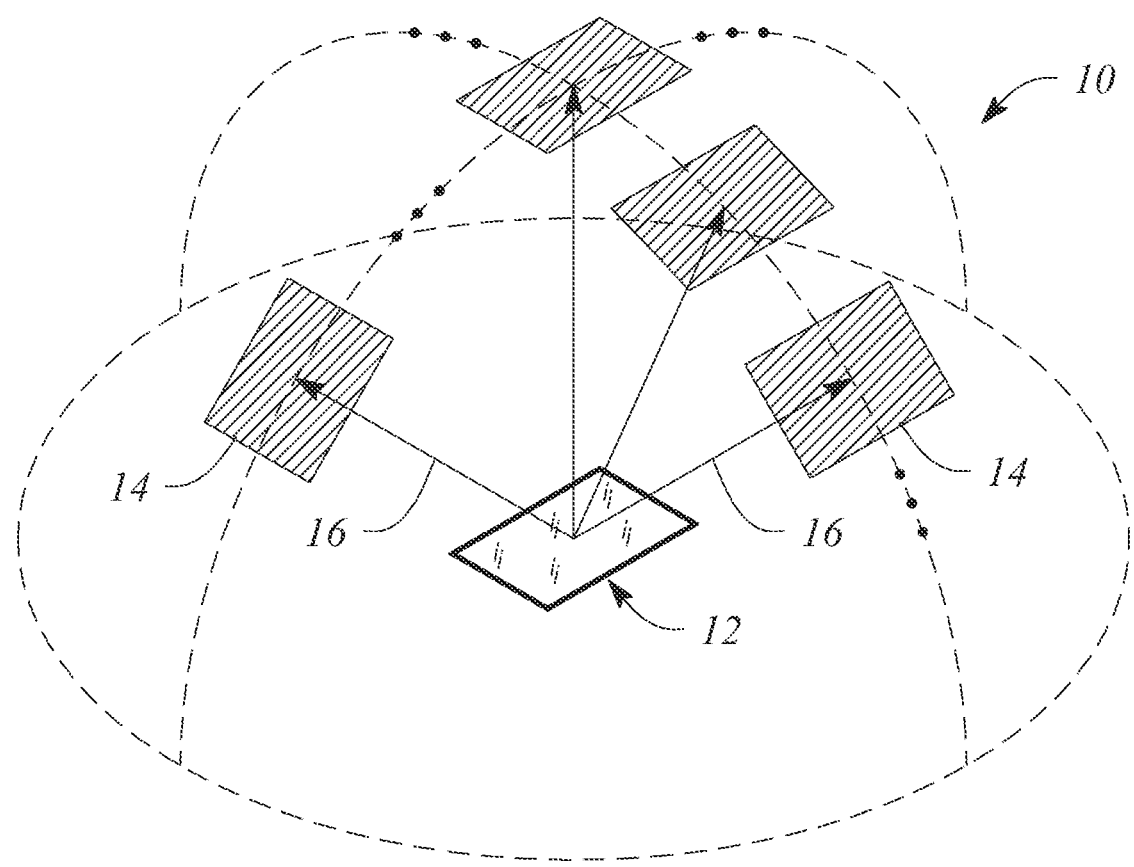
FIG. 1 illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide techniques to generate a multiview image from a single view image and a depth map in a real-time rendering pipeline. This allows visual content (e.g., images or videos) to be converted into a multiview format on the fly and presented to a user. As explained below, embodiments involve real-time view synthesis using color image and depth inputs.

According to embodiments, a shader program implements a subroutine to calculate pixel values for each synthesized view. The subroutine may use raycasting to synthesize views from one color (or grayscale) image and a depth map. Each pixel in the synthesized view may be determined by casting an individual ray onto the depth map at an angle that corresponds to the view position. For a particular view, all rays of the view have the same direction such that the rays are parallel. Each ray may correspond to a pixel to be rendered as part of a synthesized view. For each ray, the subroutine steps through points along the ray to determine where the ray intersects a virtual surface by reading depth values from the depth map. At each step along the ray, the horizontal position is incremented by a predetermined original interval, the depth position is incremented by a predetermined depth interval. In some embodiments, the vertical position may remain constant. The location where the ray intersects the virtual surface specifies the location of the coordinates used to read color from the color map corresponding to a pixel of the view, where the pixel location corresponds to an origin of the ray. In some embodiments, when a ray for a particular pixel falls below the virtual surface by a threshold amount, the pixel may be set as a hole rather than representing a color.

The shader program may be a program executed by a graphics processing unit (GPU). A GPU may include one or more vector processors that execute an instruction set to perform various subroutines in parallel. In this respect, a single subroutine may be configured to calculate an individual pixel value of a pixel of a view image as it is being synthesized. Several instances of the subroutine may execute in parallel to calculate the pixels values of all pixels of the view.

Embodiments are directed to synthesizing a view image, which may comprise accessing a color image and a corresponding depth map to synthesize the view image, the depth map defining a virtual surface. Synthesizing the view image may further comprise stepping through a plurality of points along a ray at a predetermined horizontal interval, a predetermined depth interval, and a constant vertical value until a point of the plurality of points along the ray is identified to be located at the virtual surface, wherein the ray comprises a ray origin and a ray direction, the ray origin defining a pixel location of the pixel of the view image to be rendered, and the ray direction corresponding to a view position of the view image. Synthesizing the view image may also comprise rendering the pixel of the view image by sampling a color value of the color image at the hit point.

To elaborate further, the color image may be an RGB image where the color image specifies pixel values for different pixels having respective coordinates. A pixel value may be a value that indicates an amount of red color, a value that indicates an amount of green color, a value that indicates an amount of blue color, or any combination thereof. The depth map may have a format similar to the color image, but rather than specifying color, the depth map specifies depth values for different pixels having respective coordinates. Thus, the depth map may define a virtual surface that varies along a depth axis as a function of horizontal position and vertical position. In other words, from a top-down orientation, depth may vary along a depth axis (e.g., into the screen or out of the screen), while the position varies horizontally (e.g., left or right) or vertically (e.g., up or down).

One or more view image may be synthesized from the color image and depth map. A view image corresponds to a particular perspective that is different from respective perspectives of other view images. A set of view images form a multiview image, where the multiview image represents an object or scene containing different perspectives. Each view image of a multiview image corresponds to a respective view position. For example, if the multiview image contains four views, then the view positions may range from left to right such that they contain a left-most view, left-center view, right-center view, and right-most view. The distance between each view may be referred to as gain or baseline.

A subroutine may be executed to calculate the pixel value (e.g., RGB color) for each pixel in a view image as it is synthesized and rendered. The subroutine may include stepping through a plurality of points along a ray at a predetermined horizontal interval. In this respect, the subroutine moves along a ray that is cast from a ray origin in a particular ray direction, where the ray is cast towards the virtual surface. A ray may be defined as a line within a space defined by coordinates that points towards a particular direction. When synthesizing a particular view image, parallel rays are cast from various origins towards the virtual surface of the depth map to detect depth information for the view image as it is being synthesized. Rather than reading all possible depth values along a ray path from the origin to a bottom of a scene, embodiments are directed to stepping along the ray at points defined by a predetermined horizontal interval, a predetermined depth interval, and a constant vertical value. Moreover, the subroutine is automatically terminated or is otherwise interrupted when the subroutine identifies the point on the ray that is located at the virtual surface (e.g., a hit point where the ray intersects the virtual surface). In other words, the subroutine steps along the ray at predetermined intervals until it crosses or otherwise hits the virtual surface, which is a hit point. In this respect, the depth at a point that is a hit point is equal to the corresponding depth of the virtual surface. The hit point may be slightly deeper than the virtual surface or within a tolerance of depth near the virtual surface. When using predetermined depth intervals, the quantized depth reads may approximate the location of the intersection of the ray and the virtual surface.

When this hit point is identified, the location, in terms of coordinates, is recorded. To render the pixel, the color is sampled from the color image using the recorded location of the hit point. Thus, the subroutine renders the pixel of the view image by sampling a color value of the color image at the hit point coordinates.

In some embodiments, the hit point is identified as being located at the virtual surface by comparing a depth value reading of the hit point to a threshold depth. For example, as the subroutine moves to the next point on a ray away from the origin, the subroutine reads the depth at a particular point to obtain a depth value reading. The hit point is determined by comparing the depth value reading to a threshold depth. In some embodiments, the threshold depth is decremented by the predetermined depth interval at each step. In this respect, the threshold depth may be equal to or otherwise derived from the depth coordinate of a corresponding point.

In some embodiments, synthesizing a view image further comprises detecting that an additional ray among the plurality of rays falls below the virtual surface by a predetermined depth level. While some rays intersect the virtual surface, other rays may hit a vertical edge of the virtual surface which may be considered a 'hole' depending on a steepness threshold. In some embodiments, when a hit point is on a steep surface, the subroutine may specify that a pixel that corresponds that position is a hole. When the color image is a frame of a video stream, these holes may be filled using pixel information from time-adjacent video frames. For still images, surrounding colors may be used in hole filling.

In some embodiments, a fragment shader is configured to step through the plurality of points along the ray. The fragment shader may be configured to interlace the view image with at least one other view image. Interlacing involves spatially multiplexing the pixels of different views to conform to an interlaced multiview format of a multiview display. A fragment shader may be executed by a processor that renders a particular color to an output pixel coordinate. The color may be determined by sampling the color image at locations determined by processing the depth map.

In some embodiments, the predetermined horizontal interval is one pixel, wherein the predetermined depth interval is a function of a baseline of a plurality of synthesized views. In other embodiments, the predetermined horizontal interval is a function of a baseline of a plurality of synthesized views. By using the baseline to control the granularity of steps analyzed along a ray, the subroutine may be optimized so that it reduces the number of depth reads while preserving a minimum level of image quality when synthesizing view images.

In some embodiments, the subroutine may read depth values from the depth texture of a depth map. The subroutine may begin from a position of an output pixel coordinate of the ray origin (or a predetermined offset from this position, which may be specified by a convergence input parameter). The subroutine may perform point by point reading of depth values in one direction (e.g., from left to right) or an opposing direction (e.g., from right to left), depending on the view position.

At each point along a ray, the extracted depth value is compared to a threshold depth which starts from 1 and goes towards zero with each step. This search for a hit point is terminated when a depth value reading is equal to or exceeds the threshold depth. The coordinate at which the search was terminated is used to sample the color from the color image and return it as a result of the subroutine. A fragment shader renders a pixel of the synthesized view using this sampled color.

A maximum number of horizontal steps (e.g., predetermined horizontal interval) may be modified or controlled by a baseline input parameter. The more steps, the more the generated view diverges from the input color image. The threshold depth decreasing step may equal to 1 divided by number of horizontal steps.

Additionally, to improve aliasing on edges, the predetermined horizontal interval may be modified such that the predetermined interval, such as a horizontal interval, is divided into subintervals so that a coordinate for sampling color is more precise. Adjacent depth value readings used with linear interpolation between them may be used during comparison. The predetermined depth interval may be divided into subintervals. The coordinates of the resulting hit point (e.g., where the depth value reading equals or exceeds the depth threshold) may be passed to a shader texture reading function which has support of built-in color interpolation.

Additionally, if a hole needs to be created on contrast edges (so that rendering would appear like a detached object is moved independently), the difference between the depth value reading and the depth threshold can be compared and if it is greater than a predetermined depth level, then a hole can be created for later inpainting.

In an example, a computing device can receive a color image of a scene and a depth map of the scene. The computing device can synthesize view images of a multiview image of the scene from the color image and the depth map. The view images can represent the scene from different view directions. Each view image can include pixel locations and respective color values at the pixel locations. For example, the view image may have a two-dimensional (2D) grid of pixels with each pixel having a location within the image. The computing device can render the view images of the multiview image on a multiview display of the computing device. Synthesizing a view image of the multiview image can include, for a pixel location in the view image, casting a ray from the pixel location toward the scene in a direction corresponding to the view direction of the view image; determining a ray intersection location at which the ray intersects a virtual surface specified by the depth map; and setting a color value of the view image at the pixel location to correspond to a color of the color image at the ray intersection location.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in many smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. Uses of unilateral backlighting and unilateral multiview displays described herein include, but are not limited to, mobile telephones (e.g., smart phones), watches, tablet computers, mobile computers (e.g., laptop computers), personal computers and computer monitors, automobile display consoles, cameras, displays, and various other mobile as well as substantially non-mobile display applications and devices.

FIG. 1 illustrates a perspective view of a multiview display 10 in an example, according to an embodiment consistent with the principles described herein. As illustrated in FIG. 1, the multiview display 10 comprises a screen 12 to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example.

The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1 as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14. A 2D display may be substantially similar to the multiview display 10, except that the 2D Display is generally configured to provide a single view (e.g., one view similar to view 14) of a displayed image as opposed to the different views 14 of the multiview image provided by the multiview display 10.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 2:
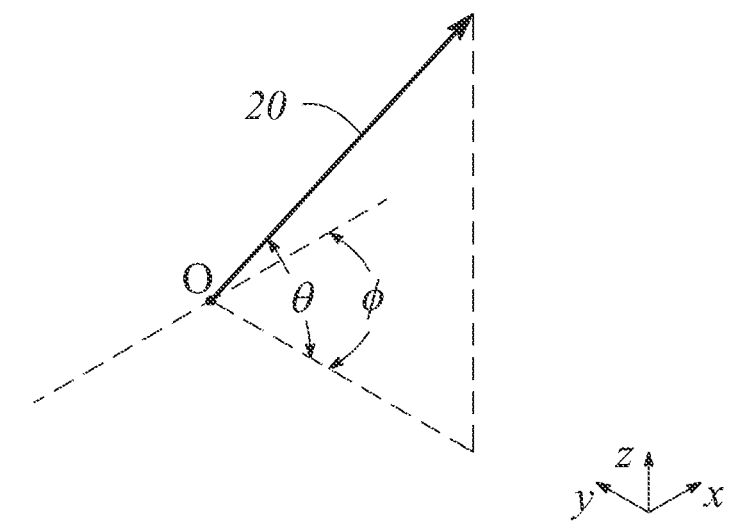
FIG. 2 illustrates a graphical representation of the angular components of a light beam having a particular principal angular direction corresponding to a view direction of a multiview display in an example, according to an embodiment consistent with the principles described herein.

FIG. 2 illustrates a graphical representation of the angular components $\{\theta, \phi\}$ of a light beam 20 having a particular principal angular direction corresponding to a view direction (e.g., view direction 16 in FIG. 1) of a multiview display in an example, according to an embodiment consistent with the principles described herein. In addition, the light beam 20 is emitted or emanates from a particular point, by definition herein. That is, by definition, the light beam 20 has a central light ray associated with a particular point of origin within the multiview display. FIG. 2 also illustrates the light beam (or view direction) point of origin O.

Further, as used herein, the article 'a' is intended to have its ordinary meaning in the patent arts, namely 'one or more'. For example, 'a computing device' means one or more computing devices and as such, 'the computing device' means 'computing device(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3:
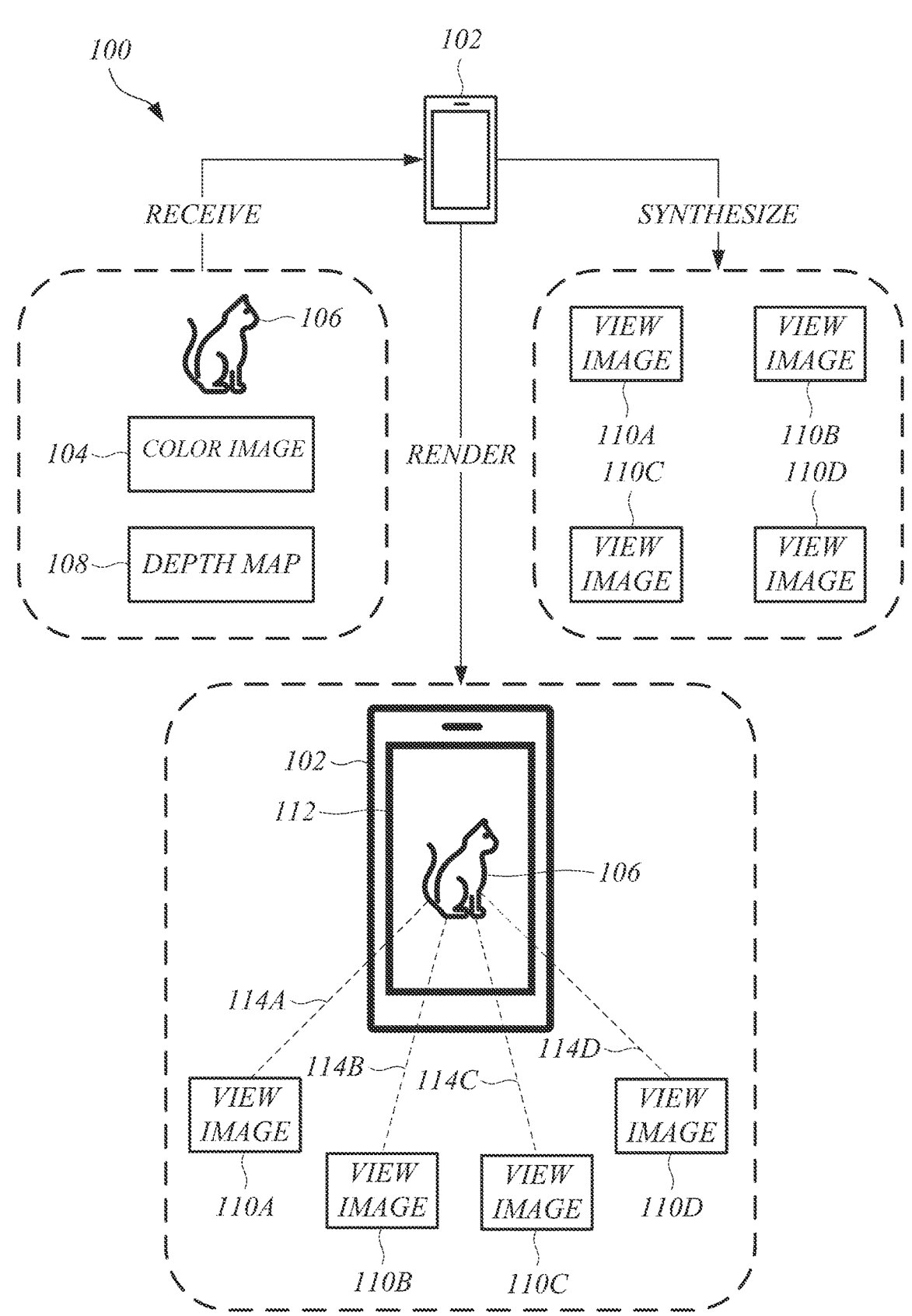
FIG. 3 shows a block diagram of an example of a system that can perform multiview image generation and display, according to an embodiment consistent with the principles described herein.
Figure 6:
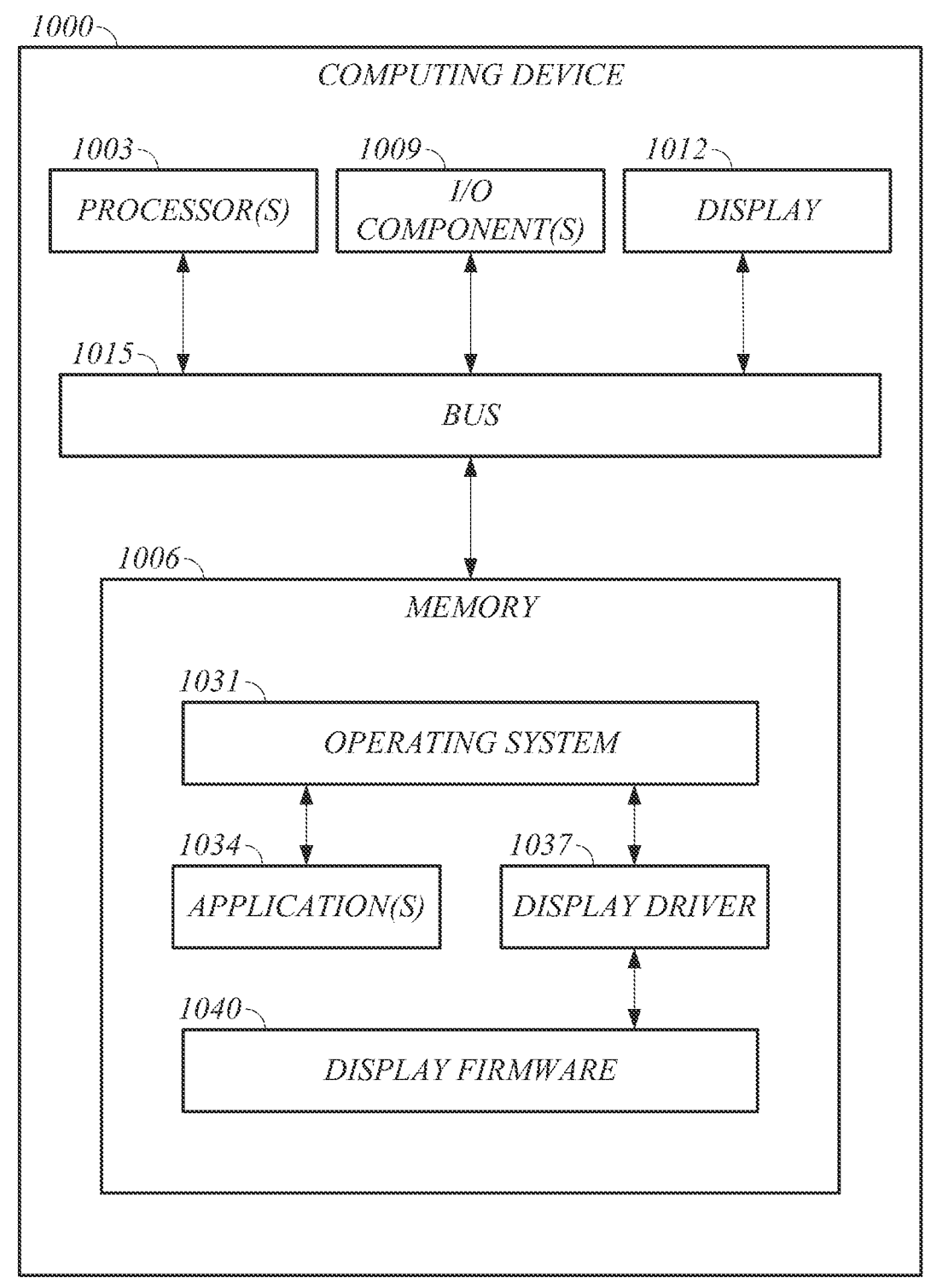
FIG. 6 is a schematic block diagram that depicts an example of a computing device that can perform multiview image generation and display, according to an embodiment consistent with the principles described herein.

FIG. 3 shows a block diagram of an example of a system 100 that can perform multiview image generation and display, according to an embodiment consistent with the principles described herein. The system 100 can include a computing device 102, such as a smart phone, a tablet, a laptop computer, and the like. FIG. 6 and the accompanying text below describe an example of a computing device 102 in detail. The computing device 102 may be configured to execute a computer-implemented method of multiview image generation and display, as described presently.

According to various embodiments, the computer-implemented method of multiview image generation when executed by the computing device 102 comprises receiving a color image 104 of a scene 106 and a depth map 108 of the scene 106. In FIG. 3, the scene 106 is depicted as a cat, although other suitable scenes can also be used. The color image 104 can include intensity and color data representing an appearance of a scene 106. The color image data can optionally be arranged to correspond to a rectangular array of location, such as pixels. In some examples, the intensity and color data can include a first value that represents an intensity for red light, a second value that represents an intensity for green light, and a third value that represents an intensity for blue light. In some examples, such as for scenes that are monochromatic, the intensity and color data can include a value that represents an intensity (e.g., including intensity information but lacking color information). The depth map 108 can describe relative distances between locations in the scene 106 and the computing device 102. For the example of the cat in the scene 106, the depth map 108 corresponding to the scene 106 can specify that the tip of the cat's tail can be farther away from the computing device 102 than the cat's right rear paw. In some examples, the color image 104 and the depth map 108 can be received from a server or storage device by a wired or wireless connection. In some examples, the color image 104 and the depth map 108 can be generated by a camera and a depth map generator included with the computing device 102. In some examples, a depth map generator may utilize time-of-flight reflections in different directions to map distances from the computing device 102 for a range of propagation directions away from the computing device 102.

Figure 4:
FIG. 4 shows a graphic representation of a simplified example of the computer-implemented operation discussed herein, according to an embodiment consistent with the principles described herein.
Figure 4:
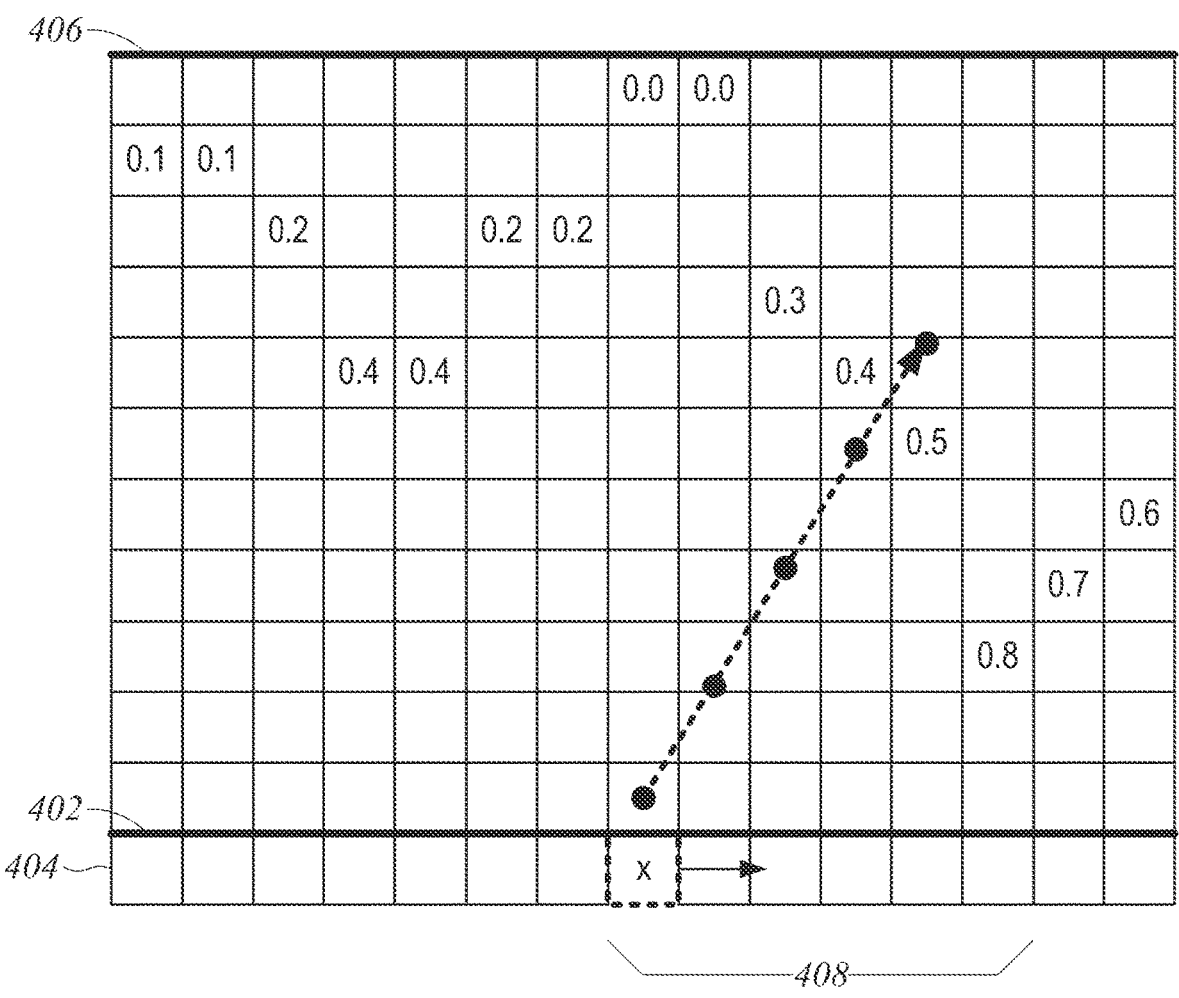

In various embodiments, the computer-implemented method of multiview image generation when executed by the computing device 102 further comprises synthesizing view images 110A, 110B, 110C, 110D (collectively referred to as view images 110) of a multiview image of the scene 106 from the color image 104 and the depth map 108. The view images 110 can represent the scene 106 from different view directions. For the example of the cat in the scene 106, the view images 110 can represent how the cat would appear if viewed from the view directions corresponding to the view images 110. Each view image 110 can include pixel locations and respective color values at the pixel locations. In the example of FIG. 3, there are four view images 110. In other examples, more or fewer than four view images 110 can be used. FIG. 4 and the accompanying text below provide additional details regarding how to synthesize the view images 110.

The computer-implemented method of multiview image generation when executed by the computing device 102 according to various embodiments further comprises rendering the view images 110 of the multiview image on a multiview display 112 of the computing device 102. The view images 110A, 110B, 110C, and 110D are viewing from respective viewing directions 114A, 114B, 114C, and 114D, respectively. For example, the computing device 102 can be configured as a smart phone, and a display of the smart phone can be configured as the multiview display 112. In some examples, the multiview image can be included as a frame in a video, such that the computing device 102 can synthesize the view images 110 and render the view images 110 at a suitable video frame rate, such as 60 frames per second, 30 frames per second, or others.

A set of computer-implemented instructions, such as referred to herein as a shader, can synthesize the view images of the multiview image. A detailed description of the shader follows below, while a summary of the shader follows presently. The shader can cast a ray from the pixel location toward the scene in a direction corresponding to the view direction of the view image. The shader is configured to determine a ray intersection location at which the ray intersects a virtual surface specified by the depth map. The shader is further configured to set a color value of the view image at the pixel location to correspond to a color of the color image at the ray intersection location.

In some examples, determining the ray intersection location can include the following operations, denoted for convenience as first through fifth operations. In a first operation, the shader can determine sequential provisional locations along the ray between the pixel location and a specified plane such that the virtual surface lies between the pixel location and the specified plane. In a second operation, the shader can identify a particular provisional location of the provisional locations along the ray. In a third operation, the shader can repeatedly determine that the identified particular provisional location lies between the pixel location and the specified plane; and the shader can advance the identified particular provisional location to a next provisional location along the ray. In a fourth operation, the shader can determine that the virtual surface lies between the pixel location and the identified particular provisional location. In a fifth operation, the shader can set the ray intersection location to correspond to a location between the identified particular provisional location and an adjacent and previously identified provisional location, inclusive.

In some of the above examples, determining the ray intersection location can include the following operations, denoted for convenience as sixth through tenth operations. The sixth through tenth operations can effectively repeat the first through fifth operations, but with a different (e.g., a finer) resolution. In a sixth operation, the shader can determine sequential second provisional locations along the ray between the identified provisional location and the adjacent and previously identified provisional location. In a seventh operation, the shader can identify a second provisional location of the second provisional locations along the ray. In an eighth operation, the shader can repeatedly determine that the identified second provisional location lies between the pixel location and the specified plane; and advance the identified second provisional location to a next second provisional location along the ray. In a ninth operation, the shader can determine that the virtual surface lies between the pixel location and the identified second provisional location. In a tenth operation, the shader can set the ray intersection location to correspond to a location between the identified second provisional location and an adjacent and previously identified second provisional location, inclusive.

In some examples, the provisional locations can be equally spaced along the ray. In some examples, the view image can define a horizontal direction parallel to top and bottom edges of the view image, a vertical direction in a plane of the view image and orthogonal to the horizontal direction, and a depth that is orthogonal to the horizontal and vertical directions. In some examples, the provisional locations can be spaced such that a horizontal component of the spacing between adjacent provisional locations corresponds to a specified value. In some examples, the specified value can correspond to a horizontal spacing between adjacent pixels in the view image.

In some examples, the different view directions can lie in a horizontal plane that is parallel to top and bottom edges of the view images. In some examples, one or both of the first through fifth operations and the first through tenth operations may not produce a viable result. Because ray casting alone may not obtain a suitable color value for the pixel location, the shader can perform additional operations to obtain the suitable color value. These additional operations are denoted for convenience as eleventh through fifteenth operations and are detailed below.

In an eleventh operation, the shader can cast a ray from the pixel location toward a depth map representing the scene in a direction corresponding to the view direction of the view image. In a twelfth operation, the shader can determine that the ray does not intersect a virtual surface specified by the depth map. In a thirteenth operation, the shader can set a color value of the view image at the pixel location to correspond to the retrieved color information. In a fourteenth operation, the shader can determine that the ray does not intersect the virtual surface specified by the depth map by determining that the ray has propagated away from the pixel location by a distance that exceeds a threshold distance.

In some examples, the view images can correspond to sequential images of a video signal. In some examples, the color information can be retrieved from the pixel location of the at least one time-adjacent video frame of the video signal. The following description pertains to details of the computer-implemented operation, such as including or using the shader, that can generate and render the view images. An intended use of the computer-implemented operation is to create an image with multiple views, such as four or more views. The multiple views can be arranged as tiles in various patterns, such as, but not limited to a two-by-two pattern or a one-by-four pattern, and a three-by-three pattern. The computer-implemented operation can synthesize the multiple views from a color image and an accompanying depth map. A depth map can be formed as a grayscale image in which brightness or intensity can represent a proximity to the viewer or to a camera.

The computer-implemented operation can synthesize multiple views so that when a human views a pair of the views, the human can perceive a stereo effect. Because humans typically have eyes that are separated horizontally, the computer-implemented operation can synthesize multiple views that are viewable from different locations that are horizontally separated. The computer-implemented operation can reduce or eliminate artifacts on the edges of shapes or on the edges of the images. Such artifacts could distract from the stereo effect.

Because the synthesized images may be included in a video image, the computer-implemented operation can synthesize the multiple views relatively quickly. Further, the computer-implemented operation can synthesize the multiple views to be compatible with a rendering pipeline, such as an OpenGL rendering pipeline. Further, the computer-implemented operation can synthesize the multiple views without performing heavy computations, which could one or both of burden a mobile device, cause temperature throttling on the mobile device.

The computer-implemented operation discussed herein can be more efficient and more robust than another approach called "forward mapping" or point-cloud rendering with an orthographic camera and horizontal skews to the matrix of the camera. In forward mapping, one creates each view by moving colors of a two-dimensional grid of colored points to one or both of the left and the right according to a corresponding depth value. The computer-implemented operation discussed herein can avoid holes, detached points, and empty areas at one or both of the left and right edges of the views that are produced by forward mapping. Further, the computer-implemented operation discussed herein does not require allocating more points than are present on a display device.

The computer-implemented operation discussed herein can be more efficient and more robust than another approach called "backward mapping," in which a color value of a point is replaced with a color value of some neighboring point, according to the depth of the point. Backward mapping can create an illusion of depth but does not accurately depict edges of the shapes. For example, foreground parts on edges of the shapes may be unexpectedly covered with a background.

The computer-implemented operation discussed herein can be more efficient and more robust than a comparable approach that uses a three-dimensional mesh. Such a mesh is computationally demanding, and therefore may not be suited for real-time generation of the multiple views.

The computer-implemented operation discussed herein can use a modified form of raycasting. Raycasting can cast a ray in a 3D space from some central point through each point of a virtual screen and can determine a hit point at a surface to set the color of the corresponding point on the screen. For view synthesis, the computer-implemented operation can determine the color of the hit point, without performing any additional raytracing. Further, the texture can determine the surface, without arranging voxel data in memory. Raycasting can provide accuracy and an ability to render a perspective view. Without the modifications discussed herein, raycasting can be computationally intensive, especially for high-quality images. It is a power consuming operation though, especially for high quality images. Without the modifications discussed herein, raycasting can divide a ray path into hundreds of steps with checks on each step. Using one or more of the modifications discussed herein, raycasting can use structures to mark so-called safe zones (e.g., zones that have no geometry) to accelerate the ray travel.

In some examples, the computer-implemented operation discussed herein can perform raycasting with a single full screen quad rendering with a relatively simple fragment (pixel) shader. In some examples, the computer-implemented operation discussed herein can achieve real-time performance and can be injected into a rendering chain of video-to-multiview workflow.

The computer-implemented operation discussed herein can use fragment shaders. A fragment shader can be a program that determines a color for a single pixel and stores the determined color information in an output buffer. The fragment shader can be executed multiple times in parallel for every pixel, with corresponding entries in the output buffer, to determine the color of every output pixel.

An example of pseudocode that can perform the computer-implemented operation discussed herein is as follows:

```
x, y = output_coord
view_id = pick one from [−1.5, −0.5, +0.5, +1.5]
direction = if (view_id < 0) −1 else +1
total_steps = abs(view_id * gain_px)
x = x − convergence * view_id * gain_px
z = 1
for _ in total_steps:
    if (read_depth(x, y) <= z) return read_color(x, y)
    x += direction
    z −= 1.0 / total_steps
return read_color(x, y)
```

FIG. 4 shows a graphic representation 400 of a simplified example of the computer-implemented operation discussed herein, according to an embodiment consistent with the principles described herein. It will be understood that the simplified example of FIG. 4 shows a one-dimensional example, in which rays propagate at a propagation angle (corresponding to a view direction) in a single plane. In practice, the depth map can extend in two dimensions, propagation directions can have components in three dimensions (e.g., two dimensions plus depth), and so forth.

In the simplified example of FIG. 4, depth away from the viewer is represented as height above a bottommost horizontal line 402. The bottommost horizontal line 402 represents a foreground boundary of the depth map. An output buffer 404 is shown below the bottommost horizontal line 402. A topmost horizontal line 406 represents a back, background plane or boundary of the depth map.

In the simplified example of FIG. 4, the depth map is shown as extending across a series of pixels. The depth map is shown as a series of height values, with one value per horizontal pixel. In the simplified example of FIG. 4, the depth map is quantized to have one of eleven possible values between 0 and 1, inclusive. In practice, actual depth map values can have a relatively large number of possible values (such as 256) between the foreground boundary and the background boundary. In the specific example of FIG. 4, from the leftmost edge to the rightmost edge of the view image, the depth increases from 0.1 to 0.4, then decreases to 0.0, then increases to 0.8, then decreases to 0.6 at the rightmost edge of the view image.

In the simplified example of FIG. 4, coordinate x is along the horizontal direction. Coordinate x can represent an output buffer pixel. The shader can be executed once for each pixel, optionally in parallel with other shader executions that correspond to other pixels. The shader can write the output of the shader (e.g., a color value) to the coordinate x. In some examples, the shader output (color value) is written to the coordinate x for which the shader is executed. In other examples, coordinate x can be a variable, which is optionally shifted (positive or negative) by an initial shift that is determined by a convergence value.

In the simplified example of FIG. 4, variable z is a variable on each iteration placed relatively to depth values on the grid. In the simplified example of FIG. 4, there are six total steps 408, corresponding to six pixels. The value of six can be calculated from a view shift multiplied by a gain. The initial value of variable z is 1.0. The initial value of coordinate x is 7 (e.g., cell number seven, where the cells are numbered sequentially beginning at zero).

At iteration number one, at coordinate x=7, the shader reads a depth (of the depth map) to be 0.0. The shader compares the value of z (initial value of 1.0) to the depth (value 0.0) at coordinate x=7. Because the z value is not less than or equal to the depth, the shader decrements the z value by an amount equal to an inverse of a total number of steps. For six steps total, the decremented value of z becomes 0.833. The coordinate x is incremented by one pixel, so that x becomes 8.

At iteration number two, at coordinate x=8, the shader reads a depth (of the depth map) to be 0.0. The shader compares the value of z (0.833) to the depth (value 0.0) at coordinate x=8. Because the z value is not less than or equal to the depth, the shader decrements the z value by an amount equal to an inverse of a total number of steps. For six steps total, the decremented value of z becomes 0.667. The coordinate x is incremented by one pixel, so that x becomes 9.

At iteration number three, at coordinate x=9, the shader reads a depth (of the depth map) to be 0.3. The shader compares the value of z (0.667) to the depth (value 0.3) at coordinate x=9. Because the z value is not less than or equal to the depth, the shader decrements the z value by an amount equal to an inverse of a total number of steps. For six steps total, the decremented value of z becomes 0.5. The coordinate x is incremented by one pixel, so that x becomes 10.

At iteration number four, at coordinate x=10, the shader reads a depth (of the depth map) to be 0.4. The shader compares the value of z (0.5) to the depth (value 0.4) at coordinate x=10. Because the z value is not less than or equal to the depth, the shader decrements the z value by an amount equal to an inverse of a total number of steps. For six steps total, the decremented value of z becomes 0.333. The coordinate x is incremented by one pixel, so that x becomes 11.

At iteration number five, at coordinate x=11, the shader reads a depth (of the depth map) to be 0.5. The shader compares the value of z (0.333) to the depth (value 0.5) at coordinate x=11. Because the z value is less than or equal to the depth, the shader reads the color from the x coordinate of x=11. The shader assigns the color value from x=11 to cell number seven of the output buffer. In other words, the preceding operations have determined a color value (such as from x=11) for a pixel (located a cell number seven) of the view image. There is no iteration number six in the simplified example of FIG. 4.

The shader can optionally perform additional comparisons by interpolating adjacent read depth values. These additional comparisons can occur at locations that are between adjacent pixels in the x coordinates. The shader can use the following quantities as inputs: color texture, depth texture, x and y coordinates of the output pixel, gain (a single scalar value), and convergence (another single scalar value).

The computer-implemented operation discussed herein can produce multiple views within a single output buffer. For example, for a configuration in which the computer-implemented operation produces four view images, the output buffer can be divided, such as with a horizontal line and a vertical line, into four areas corresponding to two-by-two tiles. In a specific example, view 0 is assigned to a top left tile, view 1 is assigned to a top right tile, view 2 is assigned to a bottom left tile, and view 3 is assigned to a bottom right tile. The computer-implemented operation discussed herein can present views 0 through 3 for different view angles arranged in a single horizontal row. In some examples, the computer-implemented operation discussed herein can set a maximum offset distance for each feature of the original view image relative to the width of the view to a specified value that can be comfortable for a user. For example, the specified value can be between 10 pixels and 20 pixels, inclusive. In some examples, marginal views (such as views 0 and 3) can receive a maximal offset, where x and y coordinates can wrap to cover a quadrant of a selected view.

When a view identifier, or view id, (such as 0, 1, 2 or 3) is known, the computer-implemented operation discussed herein can pick a view shift value from an array of predefined shift values, such as from the array [−1.5, −0.5, +0.5, +1.5]. A user or another computer-implemented routine can provide a convergence value. The convergence value can help anchor a depth plane in place by reducing a pixel shift to zero. For example, if the view images are to be shown sequentially, such as in animation, a convergence value of 0 can make a background appear to be fixed in place, such that a foreground can move from left to right. Similarly, a convergence value of 1 can make the foreground appear to be fixed in place, while the background can move from left to right. A convergence value of 0.5 can fix a central plane in place, such that the background and the foreground move in opposite directions. Other values can also be used, which can fix planes at depths that do not lie between the background and the foreground.

A user or another computer-implemented routine can provide a gain value. The gain value can increase or decrease the relative motion between the background and the foreground, as described above. Numerically, an example of an implementation of gain, in units of pixels, can be: view_shift_px=shift value array [view_id]*gain_px.

The gain value can be positive or negative. An absolute value of the gain can determine how many depths the shader can use to perform its iterations. For example, the shader may use the following number of total steps: total_steps=abs (view_shift_px). To apply the convergence, the shader can modify the x coordinate according to: x=x−convergence*view_shift_px. The shader can initialize the variable z to the value of 1.0. The shader can initialize the variable Nx to the value of the x coordinate, which can be already wrapped within view quadrant. On each step, the shader can read the depth value the from depth texture using Nx, y. On each step, the shader can increase or decrease the variable Nx by one (depending on a sign of view_shift_px) value. On each step, the shader can decrease the z variable by 1.0 divided by the total_steps. At a step when the z variable becomes less than or equal to the read depth value, the shader interrupts the iterations and returns a color value that is read from the color texture at Nx, y.

In this manner, the shader can produce forward mapped views in an output buffer. The forward mapped views can lack background-over-foreground glitches, can lack holes or detached pixels, and can lack empty sides. Because the shader can allow texture mirroring parameter sides that are not empty on resulting views, the shader can sample out of the boundary of the texture and can resolve issues with sides of the view.

Because the depth texture can include values other than zero (e.g., is not flat), the shader can interrupt the iterations earlier than the value of total_steps. Further, because the value of total_steps can be specified by comfortable limits (such as between 10 pixels and 20 pixels, inclusive), the shader can perform relatively few iterations for each pixel. Because the shader can perform relatively few iterations for each pixel, the shader can use a relatively small number of calculations to obtain the color values for the pixels in the view images, which can reduce the calculation load required for real-time performance. In general, increasing the number of views can increase the size of the output buffer, and can increase the calculation load required for real-time performance.

The computer-implemented operation discussed herein can reduce or eliminate artifacts that arise at the edges of objects, such as in areas with a relatively quick change in depth value. For example, the shader can perform additional intermediate iterations, with a number of steps being increased by a specified oversampling factor, such as four. For example, the iterations can extract a depth on each fourth step, using a previously read depth value for linear interpolation. Such intermediate iterations may produce higher quality view images, without requiring additional reads from the depth texture.

The computer-implemented operation discussed herein can optionally select a view id for each output pixel, which need not correspond directly to the quadrants discussed above. Selecting the view id in this manner can help eliminate downstream processing of the buffer, such as rearranging the pixels to a pattern compatible with a multiview display device. For example, a lenticular lens array covering the display can receive sets of thin stripes of different views under each lens. By changing the comparison read_depth(x, y)<=z to a more advanced difference check, such as a check with a threshold, the shader can leave holes for further inpainting, such as if inpainting is available and preferred over stretched edges.

In general, the computer-implemented operation discussed herein can achieve improved performance using relatively low gain values and relatively high contrast values. In general, the computer-implemented operation discussed herein can achieve improved performance for depth maps that are normalized, or at least are not darkened. In general, the computer-implemented operation discussed herein can achieve improved performance if shifting is provided only in one direction, such as horizontal or vertical.

The computer-implemented operation discussed herein can operate in real-time. The computer-implemented operation discussed herein can operate as part of an OpenGL-based rendering pipeline (a shader). The computer-implemented operation discussed herein can produce many relatively high quality forward mapped views that are shifted horizontally with respect to one another. The computer-implemented operation discussed herein can use inputs of a color image and a corresponding depth map. The computer-implemented operation discussed herein can utilize a gain parameter and a convergence parameter. The computer-implemented operation discussed herein can relate to a form of raycasting. The computer-implemented operation discussed herein can relate to synthesizing different views (such as with intent to use the views in a stereoscopic vision application) in a forward-mapping fashion with a fragment (pixel) shader. The computer-implemented operation discussed herein can strike a balance between image quality and calculation speed. The computer-implemented operation discussed herein can create an arbitrary number of orthographically horizontally skewed views from a color image and a depth map, using a single shader pass, in real-time, without preprocessing, and without allocating a 3D mesh. The computer-implemented operation discussed herein can execute on a mobile device. The computer-implemented operation discussed herein can operate with a relatively light calculation load, using relatively few iterations and relatively few texture reads. The computer-implemented operation discussed herein can produce view images with no holes or detached pixels. The computer-implemented operation discussed herein can have an internal workflow that is simpler than typical rendering via raycasting. The computer-implemented operation discussed herein can have a performance that is better than naïve forward mapping based on individual point shifting.

Figure 5:
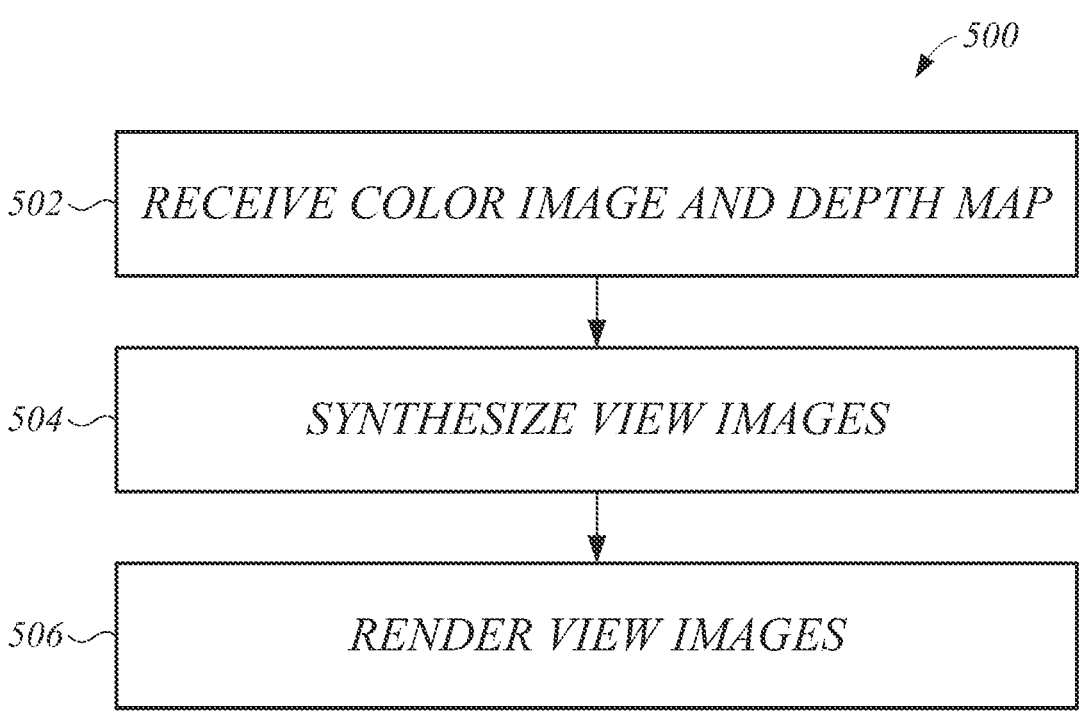
FIG. 5 shows a flowchart of an example of a method for performing multiview image generation and display, according to an embodiment consistent with the principles described herein.

FIG. 5 shows a flowchart of an example of a method 500 for performing multiview image generation and display, according to an embodiment consistent with the principles described herein. The method 500 can be executed on the system 100, or any other suitable system that can perform multiview image generation and display.

At operation 502, the system can receive a color image of a scene and a depth map of the scene. At operation 504, the system can synthesize view images of a multiview image of the scene from the color image and the depth map. The view images can represent the scene from different view directions. Each view image can include pixel locations and respective color values at the pixel locations. At operation 506, the system can render the view images of the multiview image on a multiview display.

Synthesizing the view image of the multiview image can include the following operations for a pixel location in the view image. The system can cast a ray from the pixel location toward the scene in a direction corresponding to the view direction of the view image. The system can determine a ray intersection location at which the ray intersects a virtual surface specified by the depth map. The system can set a color value of the view image at the pixel location to correspond to a color of the color image at the ray intersection location.

In some examples, determining the sequential provisional locations along the ray between the pixel location and the specified plane such that the virtual surface lies between the pixel location and the specified plane can include the following operations. The system can identify a provisional location of the provisional locations along the ray. The system can repeatedly determine that the identified provisional location lies between the pixel location and the specified plane and advance the identified provisional location to a next provisional location along the ray. The system can determine that the virtual surface lies between the pixel location and the identified provisional location. The system can set the ray intersection location to correspond to a location between the identified provisional location and an adjacent and previously identified provisional location, inclusive.

In some examples, determining the ray intersection location can further include the following operations. The system can determine sequential second provisional locations along the ray between the identified provisional location and the adjacent and previously identified provisional location. The system can identify a second provisional location of the second provisional locations along the ray. The system can repeatedly determine that the identified second provisional location lies between the pixel location and the specified plane; and advance the identified second provisional location to a next second provisional location along the ray. The system can determine that the virtual surface lies between the pixel location and the identified second provisional location. The system can set the ray intersection location to correspond to a location between the identified second provisional location and an adjacent and previously-identified second provisional location, inclusive.

In some examples, the provisional locations can be equally spaced along the ray. In some examples, the view image can define a horizontal direction being parallel to a top and bottom edges of the view image, a vertical direction being in a plane of the view image and orthogonal to the horizontal direction, and a depth that is orthogonal to the horizontal and vertical directions. In some examples, the provisional locations can be spaced such that a horizontal component of the spacing between adjacent provisional locations corresponds to a horizontal spacing between adjacent pixels in the view image.

FIG. 6 is a schematic block diagram that depicts an example of a computing device that can perform multiview image generation and display, according to an embodiment consistent with the principles described herein. The computing device 1000 may include a system of components that carry out various computing operations for a user of the computing device 1000. The computing device 1000 may be a laptop, tablet, smart phone, touch screen system, intelligent display system, other client device, server, or other computing device. The computing device 1000 may include various components such as, for example, a processor(s) 1003, a memory 1006, input/output (I/O) component(s) 1009, a display 1012, and potentially other components. These components may couple to a bus 1015 that serves as a local interface to allow the components of the computing device 1000 to communicate with each other. While the components of the computing device 1000 are shown to be contained within the computing device 1000, it should be appreciated that at least some of the components may couple to the computing device 1000 through an external connection. For example, components may externally plug into or otherwise connect with the computing device 1000 via external ports, sockets, plugs, connectors, or wireless links.

A processor 1003 may include a processor circuit such as a central processing unit (CPU), graphics processing unit (GPU), any other integrated circuit that performs computing processing operations, or any combination thereof. The processor(s) 1003 may include one or more processing cores. The processor(s) 1003 comprises circuitry that executes instructions. Instructions include, for example, computer code, programs, logic, or other machine-readable instructions that are received and executed by the processor(s) 1003 to carry out computing functionality that are embodied in the instructions. The processor(s) 1003 may execute instructions to operate on data or generate data. For example, the processor(s) 1003 may receive input data (e.g., an image), process the input data according to an instruction set, and generate output data (e.g., a processed image). As another example, the processor(s) 1003 may receive instructions and generate new instructions for subsequent execution. The processor 1003 may comprise the hardware to implement a graphics pipeline (e.g., the graphics pipeline shown schematically in FIG. 3) to render video, images, or frames generated by applications. For example, the processor(s) 1003 may comprise one or more GPU cores, vector processors, scaler processes, decoders, or hardware accelerators.

The memory 1006 may include one or more memory components. The memory 1006 is defined herein as including either or both of volatile and nonvolatile memory. Volatile memory components are those that do not retain information upon loss of power. Volatile memory may include, for example, random access memory (RAM), static random-access memory (SRAM), dynamic random-access memory (DRAM), magnetic random-access memory (MRAM), or other volatile memory structures. System memory (e.g., main memory, cache, etc.) may be implemented using volatile memory. System memory refers to fast memory that may temporarily store data or instructions for quick read and write access to assist the processor(s) 1003. Images (e.g., still images, video frames) may be stored or loaded in memory 1006 for subsequent access.

Nonvolatile memory components are those that retain information upon a loss of power. Nonvolatile memory includes read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive. The ROM may comprise, for example, a programmable read-only memory (PROM), an erasable programmable read-only memory (EPROM), an electrically erasable programmable read-only memory (EEPROM), or other like memory device. Storage memory may be implemented using nonvolatile memory to provide long term retention of data and instructions. According to various embodiments, the multiview video cache can be implemented using volatile, nonvolatile, or a combination of volatile and nonvolatile memories.

The memory 1006 may refer to a combination of volatile and nonvolatile memory used to store instructions as well as data. For example, data and instructions may be stored in nonvolatile memory and loaded into volatile memory for processing by the processor(s) 1003. The execution of instructions may include, for example, a compiled program that is translated into machine code in a format that can be loaded from nonvolatile memory into volatile memory and then run by the processor 1003, source code that is converted in suitable format such as object code that is capable of being loaded into volatile memory for execution by the processor 1003, or source code that is interpreted by another executable program to generate instructions in volatile memory and executed by the processor 1003, etc. Instructions may be stored or loaded in any portion or component of the memory 1006 including, for example, RAM, ROM, system memory, storage, or any combination thereof.

While the memory 1006 is shown as being separate from other components of the computing device 1000, it should be appreciated that the memory 1006 may be embedded or otherwise integrated, at least partially, into one or more components. For example, the processor(s) 1003 may include onboard memory registers or cache to perform processing operations.

I/O component(s) 1009 include, for example, touch screens, speakers, microphones, buttons, switches, dials, camera, sensors, accelerometers, or other components that receive user input or generate output directed to the user. I/O component(s) 1009 may receive user input and convert it into data for storage in the memory 1006 or for processing by the processor(s) 1003. I/O component(s) 1009 may receive data outputted by the memory 1006 or processor(s) 1003 and convert them into a format that is perceived by the user (e.g., sound, tactile responses, visual information, etc.).

One type of I/O component 1009 is a display 1012. The display 1012 may include a multiview display (e.g., multiview display 112), a multiview display combined with a 2D display, or any other display that presents graphic content. A capacitive touch screen layer serving as an I/O component 1009 may be layered within the display to allow a user to provide input while contemporaneously perceiving visual output. The processor(s) 1003 may generate data that is formatted as an image or frame for presentation on the display 1012. The processor(s) 1003 may execute instructions to render the image or frame on the display 1012 for the user. A camera I/O component 1009, may be used for a video capture process that captures video that may be converted into multiview video.

The bus 1015 facilitates communication of instructions and data between the processor(s) 1003, the memory 1006, the I/O component(s) 1009, the display 1012, and any other components of the computing device 1000. The bus 1015 may include address translators, address decoders, fabric, conductive traces, conductive wires, ports, plugs, sockets, and other connectors to allow for the communication of data and instructions.

The instructions within the memory 1006 may be embodied in various forms in a manner that implements at least a portion of the software stack. For example, the instructions may be embodied as an operating system 1031, an application(s) 1034, a device driver (e.g., a display driver 1037), firmware (e.g., display firmware 1040), or other software components. The operating system 1031 is a software platform that supports the basic functions of the computing device 1000, such as scheduling tasks, controlling I/O components 1009, providing access to hardware resources, managing power, and supporting applications 1034.

An application(s) 1034 executes on the operating system 1031 and may gain access to hardware resources of the computing device 1000 via the operating system 1031. In this respect, the execution of the application(s) 1034 is controlled, at least in part, by the operating system 1031. The application(s) 1034 may be a user-level software program that provides high-level functions, services, and other functionality to the user. In some embodiments, an application 1034 may be a dedicated 'app' downloadable or otherwise accessible to the user on the computing device 1000. The user may launch the application(s) 1034 via a user interface provided by the operating system 1031. The application(s) 1034 may be developed by developers and defined in various source code formats. The applications 1034 may be developed using a number of programming or scripting languages such as, for example, C, C++, C #, Objective C, Java®, Swift, JavaScript®, Perl, PHP, Visual Basic®, Python®, Ruby, Go, or other programming languages. The application(s) 1034 may be compiled by a compiler into object code or interpreted by an interpreter for execution by the processor(s) 1003. Various embodiments discussed herein may be implemented as at least part of the application 1034.

Device drivers such as, for example, the display driver 1037, include instructions that allow the operating system 1031 to communicate with various I/O components 1009. Each I/O component 1009 may have its own device driver. Device drivers may be installed such that they are stored in storage and loaded into system memory. For example, upon installation, a display driver 1037 translates a high-level display instruction received from the operating system 1031 into lower-level instructions implemented by the display 1012 to display an image.

Firmware, such as, display firmware 1040, may include machine code or assembly code that allows an I/O component 1009 or display 1012 to perform low-level operations. Firmware may convert electrical signals of particular component into higher level instructions or data. For example, display firmware 1040 may control how a display 1012 activates individual pixels at a low level by adjusting voltage or current signals. Firmware may be stored in nonvolatile memory and executed directly from nonvolatile memory. For example, the display firmware 1040 may be embodied in a ROM chip coupled to the display 1012 such that the ROM chip is separate from other storage and system memory of the computing device 1000. The display 1012 may include processing circuitry for executing the display firmware 1040.

The operating system 1031, application(s) 1034, drivers (e.g., display driver 1037), firmware (e.g., display firmware 1040), and potentially other instruction sets may each comprise instructions that are executable by the processor(s) 1003 or other processing circuitry of the computing device 1000 to carry out the functionality and operations discussed above. Although the instructions described herein may be embodied in software or code executed by the processor(s) 1003 as discussed above, as an alternative, the instructions may also be embodied in dedicated hardware or a combination of software and dedicated hardware. For example, the functionality and operations carried out by the instructions discussed above may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

In some embodiments, the instructions that carry out the functionality and operations discussed above may be embodied in a non-transitory, computer-readable storage medium. The computer-readable storage medium may or may not be part of the computing system such as computing device 1000. The instructions may include, for example, statements, code, or declarations that can be fetched from the computer-readable medium and executed by processing circuitry (e.g., the processor(s) 1003). In the context of the present disclosure, a 'computer-readable medium' may be any medium that can contain, store, or maintain the instructions described herein for use by or in connection with an instruction execution system, such as, for example, the computing device 1000.

The computer-readable medium can comprise any one of many physical media such as, for example, magnetic, optical, or semiconductor media. More specific examples of a suitable computer-readable medium may include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The computing device 1000 may perform any of the operations or implement the functionality described above. For example, the flowchart and process flows discussed above may be performed by the computing device 1000 that executes instructions and processes data. While the computing device 1000 is shown as a single device, embodiments are not so limited. In some embodiments, the computing device 1000 may offload processing of instructions in a distributed manner such that a plurality of computing devices 1000 operate together to execute instructions that may be stored or loaded in a distributed arrangement of computing components. For example, at least some instructions or data may be stored, loaded, or executed in a cloud-based system that operates in conjunction with the computing device 1000.

In particular, the non-transitory, computer-readable storage medium may store executable instructions that, when executed by a processor of a computer system, perform operations of multiview image generation and display. According to various embodiments, the operations may comprise receiving a color image of a scene and a depth map of the scene. The operations may further comprise synthesizing view images of a multiview image of the scene from the color image and the depth map. In various embodiments, the view images may represent the scene from different view directions and each view image may include pixel locations and respective color values at the pixel locations. Further, the operations may comprise rendering the view images of the multiview image on a multiview display.

According to various embodiments, synthesizing a view image of the multiview image comprises, for a pixel location in the view image, casting a ray from the pixel location toward the scene in a direction corresponding to the view direction of the view image. Synthesizing a view image further comprises determining a ray intersection location at which the ray intersects a virtual surface specified by the depth map and setting a color value of the view image at the pixel location to correspond to a color of the color image at the ray intersection location.

In some embodiments, determining the ray intersection location may comprise determining sequential provisional locations along the ray between the pixel location and a specified plane such that the virtual surface lies between the pixel location and the specified plane. Determining the ray intersection location may further comprise identifying a provisional location of the provisional locations along the ray. In particular, identifying the provisional location may include repeatedly determining that the identified provisional location lies between the pixel location and the specified plane and advancing the identified provisional location to a next provisional location along the ray.

According to these embodiments, determining the ray intersection location may further comprises determining that the virtual surface lies between the pixel location and the identified provisional location. Further, determining the ray intersection location may comprise setting the ray intersection location to correspond to a location between the identified provisional location and an adjacent and previously identified provisional location.

According to some embodiments, determining the ray intersection location further comprises determining sequential second provisional locations along the ray between the identified provisional location and the adjacent and previously identified provisional location and identifying a second provisional location of the second provisional locations along the ray. In particular, identifying the second provisional location may include repeatedly determining that the identified second provisional location lies between the pixel location and the specified plane and advancing the identified second provisional location to a next second provisional location along the ray.

In some of these embodiments, determining the ray intersection location further comprises determining that the virtual surface lies between the pixel location and the identified second provisional location. Further, determining the ray intersection location may comprise setting the ray intersection location to correspond to a location between the identified second provisional location and an adjacent and previously-identified second provisional location.

In some embodiments, the provisional locations are equally spaced along the ray. In some embodiments, the view image may define a horizontal direction being parallel to a top and bottom edges of the view image. Here a vertical direction may be in a plane of the view image and orthogonal to the horizontal direction, and a depth that is orthogonal to the horizontal and vertical directions. In some embodiments, the provisional locations are spaced such that a horizontal component of the spacing between adjacent provisional locations corresponds to a horizontal spacing between adjacent pixels in the view image.

Thus, there have been described examples and embodiments of generating and using a multiview video cache, for example, for multiview video rendering. The cache can include at least a pair of cache data entries corresponding to a target timestamp, and first and second cache data entries of the pair can include respective first and second image frame groups. The first image frame group can correspond to a first multiview frame preceding the target timestamp and the second image frame group can correspond to a second multiview frame following the target timestamp. Views of a particular multiview frame, corresponding to the target timestamp, can be generated using information from the first and second image frame groups from the cache. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A computer-implemented method of multiview image generation and display, the method comprising:

receiving, with a computing device, a color image of a scene and a depth map of the scene;

synthesizing, with the computing device, view images of a multiview image of the scene from the color image and the depth map, the view images representing the scene from different view directions, each view image including pixel locations and respective color values at the pixel locations; and rendering the view images of the multiview image on a multiview display of the computing device, wherein synthesizing a view image of the view images of the multiview image comprises, for a pixel location of the pixel locations in the view image:

casting a ray from the pixel location toward the scene in a direction corresponding to the view direction of the view image;

determining a ray intersection location at which the ray intersects a virtual surface specified by the depth map; and setting a color value of the respective color values of the view image at the pixel location to correspond to a color of the color image at the ray intersection location; and wherein determining the ray intersection location comprises:

determining sequential provisional locations along the ray between the pixel location and a specified plane such that the virtual surface lies between the pixel location and the specified plane;

identifying a provisional location of the sequential provisional locations along the ray comprising:

determining that the identified provisional location lies between the pixel location and the specified plane; and advancing the identified provisional location to a next provisional location along the ray;

determining that the virtual surface lies between the pixel location and the identified provisional location; and setting the ray intersection location to correspond to a location between the identified provisional location and an adjacent and previously identified provisional location, inclusive.

2. The computer-implemented method of claim 1, wherein determining the ray intersection location further comprises:

determining sequential second provisional locations along the ray between the identified provisional location and the adjacent and previously identified provisional location;

identifying a second provisional location of the sequential second provisional locations along the ray comprising:

determining that the identified second provisional location lies between the pixel location and the specified plane; and advancing the identified second provisional location to a next second provisional location along the ray;

determining that the virtual surface lies between the pixel location and the identified second provisional location; and setting the ray intersection location to correspond to a location between the identified second provisional location and an adjacent and previously-identified second provisional location, inclusive.

3. The computer-implemented method of claim 1, wherein the provisional locations are equally spaced along the ray.

4. The computer-implemented method of claim 3, wherein:

the view image defines a horizontal direction being parallel to a top and bottom edges of the view image, a vertical direction being in a plane of the view image and orthogonal to the horizontal direction, and a depth that is orthogonal to the horizontal and vertical directions; and the provisional locations are spaced such that a horizontal component of a spacing between adjacent provisional locations corresponds to a specified value.

5. The computer-implemented method of claim 4, wherein the specified value corresponds to a horizontal spacing between adjacent pixels in the view image.

6. The computer-implemented method of claim 1, wherein synthesizing a view image of the view images of the multiview image comprises, for the pixel location in the view image:

casting the ray from the pixel location toward the scene in the direction corresponding to the view direction of the view image;

determining that the ray does not intersect the virtual surface specified by the depth map;

retrieving color information from at least one time-adjacent video frame of the view images of the multiview image; and setting the color value of the respective color values of the view image at the pixel location to correspond to the retrieved color information.

7. The computer-implemented method of claim 6, wherein determining that the ray does not intersect the virtual surface specified by the depth map comprises determining that the ray has propagated away from the pixel location by a distance that exceeds a threshold distance.

8. The computer-implemented method of claim 6, wherein the view images correspond to sequential images of a video signal; and the color information is retrieved from the pixel location of the at least one time-adjacent video frame of the video signal.

9. The computer-implemented method of claim 1, wherein the different view directions lie in a horizontal plane that is parallel to top and bottom edges of the view images.

10. A system configured to perform multiview image generation and display, the system comprising:

a multiview display;

a central processing unit; and a memory that stores a plurality of instructions, which, when executed, cause the central processing unit to perform operations, the operations comprising:

receiving a color image of a scene and a depth map of the scene;

synthesizing view images of a multiview image of the scene from the color image and the depth map, the view images representing the scene from different view directions, each view image including pixel locations and respective color values at the pixel locations; and rendering the view images of the multiview image on the multiview display, wherein synthesizing a view image of the view images of the multiview image comprises, for a pixel location of the pixel locations in the view image:

casting a ray from the pixel location toward the scene in a direction corresponding to the view direction of the view image;

determining a ray intersection location at which the ray intersects a virtual surface specified by the depth map; and setting a color value of the respective color values of the view image at the pixel location to correspond to a color of the color image at the ray intersection location; and wherein determining the ray intersection location comprises:

determining sequential provisional locations along the ray between the pixel location and a specified plane such that the virtual surface lies between the pixel location and the specified plane;

identifying a provisional location of the sequential provisional locations along the ray comprising:

determining that the identified provisional location lies between the pixel location and the specified plane; and advancing the identified provisional location to a next provisional location along the ray;

determining that the virtual surface lies between the pixel location and the identified provisional location; and setting the ray intersection location to correspond to a location between the identified provisional location and an adjacent and previously identified provisional location, inclusive.

11. The system of claim 10, wherein determining the ray intersection location further comprises:

determining sequential second provisional locations along the ray between the identified provisional location and the adjacent and previously identified provisional location;

identifying a second provisional location of the sequential second provisional locations along the ray comprising:

determining that the identified second provisional location lies between the pixel location and the specified plane; and advancing the identified second provisional location to a next second provisional location along the ray;

determining that the virtual surface lies between the pixel location and the identified second provisional location; and setting the ray intersection location to correspond to a location between the identified second provisional location and an adjacent and previously-identified second provisional location, inclusive.

12. The system of claim 10, wherein the provisional locations are equally spaced along the ray.

13. The system of claim 12, wherein:

the view image defines a horizontal direction being parallel to a top and bottom edges of the view image, a vertical direction being in a plane of the view image and orthogonal to the horizontal direction, and a depth that is orthogonal to the horizontal and vertical directions; and the provisional locations are spaced such that a horizontal component of a spacing between adjacent provisional locations corresponds to a horizontal spacing between adjacent pixels in the view image.

14. The system of claim 10, wherein the different view directions lie in a horizontal plane that is parallel to top and bottom edges of the view images.

15. A non-transitory, computer-readable storage medium storing executable instructions that, when executed by a processor of a computer system, perform operations of multiview image generation and display, the operations comprising:

receiving a color image of a scene and a depth map of the scene;

synthesizing view images of a multiview image of the scene from the color image and the depth map, the view images representing the scene from different view directions, each view image including pixel locations and respective color values at the pixel locations; and rendering the view images of the multiview image on a multiview display, wherein synthesizing a view image of the view images of the multiview image comprises, for a pixel location of the pixel locations in the view image:

casting a ray from the pixel location toward the scene in a direction corresponding to the view direction of the view image;

determining a ray intersection location at which the ray intersects a virtual surface specified by the depth map; and setting a color value of the respective color values of the view image at the pixel location to correspond to a color of the color image at the ray intersection location; and wherein determining the ray intersection location comprises:

determining sequential provisional locations along the ray between the pixel location and a specified plane such that the virtual surface lies between the pixel location and the specified plane;

identifying a provisional location of the sequential provisional locations along the ray comprising repeatedly:

determining that the identified provisional location lies between the pixel location and the specified plane; and advancing the identified provisional location to a next provisional location along the ray;

determining that the virtual surface lies between the pixel location and the identified provisional location; and setting the ray intersection location to correspond to a location between the identified provisional location and an adjacent and previously identified provisional location.

16. The non-transitory, computer-readable storage medium of claim 15, wherein determining the ray intersection location further comprises:

determining sequential second provisional locations along the ray between the identified provisional location and the adjacent and previously identified provisional location;

identifying a second provisional location of the sequential second provisional locations along the ray comprising repeatedly:

determining that the identified second provisional location lies between the pixel location and the specified plane; and advancing the identified second provisional location to a next second provisional location along the ray;

determining that the virtual surface lies between the pixel location and the identified second provisional location; and setting the ray intersection location to correspond to a location between the identified second provisional location and an adjacent and previously-identified second provisional location, inclusive.

17. The non-transitory, computer-readable storage medium of claim 15, wherein:

the provisional locations are equally spaced along the ray;

the view image defines a horizontal direction being parallel to a top and bottom edges of the view image, a vertical direction being in a plane of the view image and orthogonal to the horizontal direction, and a depth that is orthogonal to the horizontal and vertical directions; and the provisional locations are spaced such that a horizontal component of a spacing between adjacent provisional locations corresponds to a horizontal spacing between adjacent pixels in the view image.

\* \* \* \* \*